United States Patent
Karczewicz et al.

(10) Patent No.: US 6,795,584 B2
(45) Date of Patent: Sep. 21, 2004

(54) CONTEXT-BASED ADAPTIVE VARIABLE LENGTH CODING FOR ADAPTIVE BLOCK TRANSFORMS

(75) Inventors: Marta Karczewicz, Irving, TX (US); Justin Ridge, Sachse, TX (US)

(73) Assignee: Nokia Corporation, Espoo (FI)

(*) Notice: Subject to any disclaimer, the term of this patent is extended or adjusted under 35 U.S.C. 154(b) by 43 days.

(21) Appl. No.: 10/264,279

(22) Filed: Oct. 3, 2002

(65) Prior Publication Data
US 2004/0066974 A1 Apr. 8, 2004

(51) Int. Cl.[7] .................................................. G06K 9/36
(52) U.S. Cl. ...................................... 382/239; 382/236
(58) Field of Search ................................. 382/236, 238, 382/239; 341/51, 50; 348/404, 406, 407, 419; 358/426.02, 426.05; 704/270.1; 375/240.27

(56) References Cited

U.S. PATENT DOCUMENTS 6,577,251 B1 * 6/2003 Yip ............................ 341/50

2003/0012286 A1 * 1/2003 Ishtiaq et al. .......... 375/240.27

OTHER PUBLICATIONS

Video compression using contest based adaptive arithmetic coding, by Marpe IEEE 2001 publication pp. 558–561.*

* cited by examiner

Primary Examiner—Vikkram Bali
(74) Attorney, Agent, or Firm—Ware, Fressola, Van Der Sluys & Adolphson

(57) ABSTRACT

A method and system for coding an image using context-based adaptive VLC where transform coefficients are partitioned into blocks having a block dimension of 4n×4m (with n, m being positive integer equal to or greater than 1). Each block is scanned in a zigzag manner to produce an ordered vector of coefficients having a length of 16n×m. The ordered vector is sub-sampled in an interleaved manner to produce n×m sub-sampled sequences of transform coefficients prior to encoding the transform coefficients using an entropy encoder.

16 Claims, 9 Drawing Sheets

| 0 | 1 | 2 | 3 | 4 | 5 | 6 | 7 | ... | 58 | 59 | 60 | 61 | 62 | 63 |

FIG. 8a

| 0 | 4 | 8 | 12 | 16 | 20 | 24 | 28 | 32 | 36 | 40 | 44 | 48 | 52 | 56 | 60 |

FIG. 8b

| 1 | 5 | 9 | 13 | 17 | 21 | 25 | 29 | 33 | 37 | 41 | 45 | 49 | 53 | 57 | 61 |

FIG. 8c

| 2 | 6 | 10 | 14 | 18 | 22 | 26 | 30 | 34 | 38 | 42 | 46 | 50 | 54 | 58 | 62 |

FIG. 8d

| 3 | 7 | 11 | 15 | 19 | 23 | 27 | 31 | 35 | 39 | 43 | 47 | 51 | 55 | 59 | 63 |

FIG. 11a

| 12 | 28 | 44 | 60 |
| 8 | 24 | 40 | 56 |
| 4 | 20 | 36 | 52 |
| 0 | 16 | 32 | 48 |

FIG. 11b

| 13 | 29 | 45 | 61 |
| 9 | 25 | 41 | 57 |
| 5 | 21 | 37 | 53 |
| 1 | 17 | 33 | 49 |

FIG. 11c

| 14 | 30 | 46 | 62 |
| 10 | 26 | 42 | 58 |
| 6 | 22 | 38 | 54 |
| 2 | 18 | 34 | 50 |

FIG. 11d

| 15 | 31 | 47 | 63 |
| 11 | 27 | 43 | 59 |
| 7 | 23 | 39 | 55 |
| 3 | 19 | 35 | 51 |

CONTEXT-BASED ADAPTIVE VARIABLE LENGTH CODING FOR ADAPTIVE BLOCK TRANSFORMS

FIELD OF THE INVENTION

The present invention is generally related to the field of video coding and compression and, more particularly, to a method and system for context-based adaptive variable length coding.

BACKGROUND OF THE INVENTION

A typical video encoder partitions each frame of the original video sequence into contiguous rectangular regions called "blocks". These blocks are encoded in "intra mode" (I-mode), or in "inter mode" (P-mode). For P-mode, the encoder first searches for a block similar to the one being encoded in a previously transmitted "reference frame", denoted by $F_{ref}$. Searches are generally restricted to being no more than a certain spatial displacement from the block to be encoded. When the best match, or "prediction", has been identified, it is expressed in the form of a two-dimensional (2D) motion vector $(\Delta x, \Delta y)$ where $\Delta x$ is the horizontal and $\Delta y$ is the vertical displacement. The motion vectors together with the reference frame are used to construct a predicted block $F_{pred}$:

$$F_{pred}(x,y) = F_{ref}(x+\Delta x, y+\Delta y)$$

The location of a pixel within the frame is denoted by (x, y).

For blocks encoded in I-mode, the predicted block is formed using spatial prediction from previously encoded neighboring blocks within the same frame. For both I-mode and P-mode, the prediction error, i.e. the difference between the block being encoded and the predicted block, is represented as a set of weighted basis functions of some discrete transform. Transforms are typically performed on an 8×8 or 4×4 block basis. The weights—transform coefficients—are subsequently quantized. Quantization introduces loss of information, thus quantized coefficients have lower precision than the original ones.

Quantized transform coefficients and motion vectors are examples of "syntax elements". These, plus some control information, form a complete coded representation of the video sequence. Prior to transmission from the encoder to the decoder, all syntax elements are entropy coded, thereby further reducing the number of bits needed for their representation. Entropy coding is a lossless operation aimed at minimizing the number of bits required to represent transmitted or stored symbols (in our case syntax elements) by utilizing properties of their distribution (some symbols occur more frequently than others).

One method of entropy coding employed by video coders is Variable Length Codes (VLC). A VLC codeword, which is a sequence of bits (0's and 1's), is assigned to each symbol. The VLC is constructed so that the codeword lengths correspond to how frequently the symbol represented by the codeword occurs, e.g. more frequently occurring symbols are represented by shorter VLC codewords. Moreover, the VLC must be constructed so that the codewords are uniquely decodable, i.e., if the decoder receives a valid sequence of bits of a finite length, there must be only one possible sequence of input symbols that, when encoded, would have produced the received sequence of bits.

To correctly decode the bitstream, both encoder and decoder have to use the same set of VLC codewords and the same assignment of symbols to them. As discussed earlier, to maximize the compression, the most frequently occurring symbols should be assigned the shortest VLC codewords. However, the frequency (probability) of different symbols is dependant upon the actual frame being encoded. In the case where a single set of VLC codewords, and a constant assignment of symbols to those codewords is used, it is likely that the probability distribution of symbols within a given frame will differ from the probabilities assumed by the VLC, even though the average symbol probability across the entire sequence may not. Consequently, using a single set of VLC codewords and a single assignment of symbols to those codewords reduces coding efficiency.

To rectify this problem different methods of adaptation are used. One approach, which offers reasonable computational complexity, and a good compression versus efficiency trade-off, and which is currently used in the state-of-the art video coders, is now described. For a set of symbols, a number of tables specifying VLC codewords (VLCs) are provided for the encoder and the decoder to use. The table selected to encode a particular symbol then depends on the information known both to the encoder and decoder, such as the type of the coded block (I- or P-type block), the component (luma or chroma) being coded, or the quantization parameter (QP) value. The performance depends on how well the parameters used to switch between the VLCs characterize the symbol statistics.

In the decoder, the block in the current frame is obtained by first constructing its prediction in the same manner as in the encoder, and by adding to the prediction the compressed prediction error. The compressed prediction error is found by weighting the transform basis functions using the quantized coefficients. The difference between the reconstructed frame and the original frame is called reconstruction error.

The compression ratio, i.e. the ratio of the number of bits used to represent original sequence and the compressed one, may be controlled by adjusting the value of the quantization parameter (QP) used when quantizing transform coefficients. The compression ratio also depends on the method of entropy coding employed.

Coefficients in a given block are ordered (scanned) using zigzag scanning, resulting in a one-dimensional ordered coefficient vector. An exemplary zigzag scan for a 4×4 block is shown in FIG. 1.

Zigzag scanning presumes that, after applying 2 dimensional (2D) transform, the transform coefficients having most energy (i.e. higher value coefficients) correspond to low frequency transform functions and are located toward the top-left of the block as it is depicted in FIG. 1. Thus, in a coefficient vector produced through zigzag scanning, the higher magnitude coefficients are most likely to appear toward the start of the vector. After quantization most of the low energy coefficients become equal to 0.

The vector of coefficients can be further processed so that each nonzero coefficient is represented by 2 values: a run (the number of consecutive zero coefficients proceeding a nonzero value in the vector), and a level (the coefficient's value).

CAVLC (Context-based Adaptive VLC) is the method of coding transform coefficients used in the JVT coder "Joint Final Committee Draft (JFCD) of Joint Video Specification (ITU-T Rec. H.264 | ISO/IEC 14496-10 AVC". In summary, encoding a single 4×4 block using CAVLC involves five steps:

1. Encoding the total number of nonzero coefficients in the block, combined with the number of "trailing ones".

The number of trailing ones is defined as the number of coefficients with a magnitude of one that are encountered before a coefficient with magnitude greater than one is encountered when the coefficient vector is read in reverse order (i.e. 15, 14, 13, 12, 11, . . . in FIG. 1). The VLC used to code this information is based upon a predicted number of nonzero coefficients, where the prediction is based on the number of nonzero coefficients in previously encoded neighboring blocks (upper and left blocks).

2. Encoding the sign of any trailing ones.
3. Encoding the levels (magnitudes) of nonzero coefficients other than the trailing ones.
4. Encoding the number of zero values in the coefficient vector before the last nonzero coefficient, i.e. the sum of all the "runs". The VLC used when coding this value depends upon the total number of nonzero coefficients in the block, since there is some relationship between these two values.
5. Encoding the run that occurs before each nonzero coefficient, starting from the last nonzero value in the coefficient vector.

The VLC used to encode a run value is selected based upon the sum of the runs from step (4), and the sum of the runs coded so far. For example, if a block has a "sum of runs" of 8, and the first run encoded is 6, then all remaining runs must be 0, 1, or 2. Because the possible run length becomes progressively shorter, more efficient VLC codes are selected to minimize the number of bits required to represent the run.

A typical block-based video encoder is shown in FIG. 2. As shown in FIG. 1, the video server 100 comprises a front-end unit 10, which receives video signals 110 from a video source, and a video multiplex coder 40. Each frame of uncompressed video provided from the video source to the input 110 is received and processed macroblock-by-macroblock in a raster-scan order. The front-end unit 10 comprises a coding control manager 12 to switch between the I-mode and P-mode and to perform timing coordination with the multiplex coder 40 via control signals 120, a DCT (Discrete Cosine Transform) transformation module 16 and a quantizer 14 to provide quantized DCT coefficients. The quantized DCT coefficients 122 are conveyed to the multiplex coder 40. The front-end unit 10 also comprises an inverse quantizer 18 and an inverse transformation unit 20 to perform an inverse block-based discrete cosine transform (IDCT), and a motion compensation prediction and estimation module 22 to reduce the temporal redundancy in video sequences and to provide a prediction error frame for error prediction and compensation purposes. The motion estimation module 22 also provides a motion vector 124 for each macroblock to the multiplex coder 40. The multiplex coder 40 typically comprises a scanning module 42 to perform the zigzag scan for forming an order vector for each block of image data, an entropy coding module to designate non-zero quantized DCT coefficients with run and level parameters. The run and level values are further mapped to a sequence of bins, each of which is assigned to a so-called 'context' by a context assignment module 46. The contexts, along with the motion vector, is formatted into a bitstream 140. A context-based encoder is known in the art. Furthermore, it is possible that the transformation module 16 is a FFT (Fast Fourier Transform) module or DFT (Discrete Fourier Transform) module, and that DCT can be an approximation of a DCT.

A typical decoder is shown in FIG. 3. As shown, a client 200 comprises a video multiplex decoder 60, which receives the encoded video bitstream 140 from the encoder 40. The decoder 60 also decodes an I-mode frame on a macroblock-by-macroblock basis. Based on the VLC codewords contained in the bitstream 140, a coefficient extractor module 62 in the decoder 60 recovers the run and level values, and then reconstructs an array of quantized DCT coefficients 162 for each block of the macroblock. The encoded motion vector information associated with the macroblock is extracted from the encoded video bitstream 140. The extracted motion vector 166, along with the reconstructed quantized DCT coefficients 162, is provided to a back-end unit 80. An inverse quantizer 84 inverse quantizes the quantized DCT coefficients 162 representing the prediction error information for each block of the macroblock provides the results to an inverse transformer 86. With the control information provided by a coding control manager 82, an array of reconstructed prediction error values for each block of the macroblock is yielded in order to produce video signals 180.

Currently, video and still images are typically coded with help of a block-wise transformation to frequency domain. Such coding method is used in H.26L (or H.264-to-be) standard by the Joint Video Team (JVT). In such a method, the image is first subdivided into blocks of 4×4 pixels in size and the blocks are transformed into a 4×4 matrix of transform coefficients. The coefficients are then arranged by scanning them along a zigzag path, wherein the low-frequency coefficients are placed first in the scan in order to form an ordered sequence of transform coefficients—a one-dimensional vector. A 4×4 transform coefficient matrix of FIG. 1 will result in a one-dimension array or a sequence of 1, 2, 5, 9, 6, 3, 4, 7, 10, 13, 14, 11, 8, 12, 15, 16. This is advantageous because the following step is to code the quantized values of the DCT coefficients by run-length coding, whereby the more probable runs are represented by short codes (Huffman coding or arithmetic coding). Arranged in such a manner, many of the coefficients at the end of the scan usually end up being zero. Thus the coefficients are coded with high-efficiency. It is known that variable-length coding means that not all symbols have the same length (in bits). Huffman coding is an example of variable-length coding. Arithmetic is slightly different in that it involves a series of symbols. Thus, it is in general not possible to describe the length of ONE symbol as requiring X bits. Rather, a specific series of symbols will require Y bits. For this reason "entropy coding" is perhaps a more general term than "variable-length coding".

The above-described coding scheme is used for producing a block transform of 4×4 pixels. However, Context-based Adaptive VLC (CAVLC) may involve in partitioning the transform coefficients into blocks that are larger than 4×4. For example, the JVT coder contains a feature called "Adaptive Block Transforms" (ABT) which performs transforms on 4×8, 8×4, and 8×8 blocks. Thus, the coding scheme designed for 4×4 blocks can no longer be applied. A solution to the problem is to split the larger block into sub-blocks of size 4×4.

An existing solution has been proposed, wherein the ABT block of coefficients is divided into 4×4 blocks in the spatial domain. As an example, an 8×8 block is shown in FIG. 4 with one of the scan orders used for this block in the JVT coder. The same block partitioned into four 4×4 blocks is shown in FIGS. 5a to 5c. Subsequently each 4×4 block is zigzag scanned using 4×4 scan, yielding a plurality of vectors of length 16. These length 16 vectors are then passed to the standard 4×4 CAVLC algorithm. When 4×4 scan shown in FIG. 1 is used for the 4×4 blocks in FIGS. 5a to 5c, the resulting vectors are as given in FIGS. 6a to 6c.

This existing CAVLC algorithm makes certain assumptions about the content of a coefficient vector. When these assumptions are violated, the coding tables (i.e. the tables specifying which codeword is used to describe which symbol) used by CAVLC are "mismatched". This means that the length of codewords in the table no longer accurately reflects the probability of a symbol, and consequently CAVLC is less efficient.

As a result of this existing approach, each of the 4×4 blocks created after partitioning of the ABT block has coefficients corresponding to different frequencies in the ABT transform. For example, the 4×4 block of FIG. 5a contains low frequency information (both horizontally and vertically) and therefore most of the high amplitude coefficients. Likewise, the 4×4 block of FIG. 5d contains high frequency information and low amplitude coefficients. The CAVLC algorithm assumes that higher magnitudes generally occur toward the start of the vector, and critically, it assumes that longer runs of zeros will generally occur toward the end of a vector. The 4×4 block of FIG. 5d is statistically unlikely to contain many values in the 4×4 block of FIG. 5a, and the "outlying" values are likely to have long runs of zeros associated with them. Although the 4×4 block of FIG. 5d may contain one or two nonzero coefficients, the locations of those coefficients are mismatched with what CAVLC expects, and consequently coding of that block requires a disproportionately large number of bits.

The CAVLC method also assumes that the neighboring blocks have similar number of nonzero coefficients. For the blocks, which have coefficients corresponding to different frequencies of transform functions the number of nonzero coefficients vary drastically. That can lead to the wrong choice of the VLC table used to code the number of the nonzero coefficient of a given block since this choice is based on the number of the nonzero coefficients of its neighbors.

Thus, the existing block partitioning scheme is not an optimal solution in terms of coding efficiency and quantization accuracy.

It is advantageous and desirable to provide a more efficient method and system for video and image coding, which can be applied to ABT blocks having a general size of (4 n)×(4 m) where n and m are positive integers equal to or greater than 1.

SUMMARY OF THE INVENTION

It is a primary objective of the present invention to reduce the number of bits required to represent the quantized coefficients that result after application of a block transform larger than 4×4. More precisely, it is aimed at reducing the number of bits required to represent coefficients resulting from a 4×8, 8×4, or 8×8 transform. Moreover, in order to simplify design of the JVT encoder as well as to minimize the memory required by the code implementing JVT, it is desirable that the CAVLC method developed for 4×4 block is used to code 4×8, 8×4, or 8×8 blocks unchanged or with minimal modifications.

The objective can be achieved by partitioning a block larger than 4×4 by a plurality of sub-block of size 4×4 using the original vector in an interleaved fashion.

Thus, according to the first aspect of the present invention, a method of image coding characterized by
  forming at least a block of transform coefficients from the image data, by
  scanning the block of transform coefficients for providing a sequence of transform coefficients, by
  sub-sampling the transform coefficients in the sequence in an interleaved manner for providing a plurality of sub-sampled sequences of transform coefficients, and by
  coding the sub-sampled sequences of transform coefficients using an entropy encoder.

Advantageously, said sub-sampling is carried out prior to or after said coding.

Preferably, the sequence of the transform coefficients has a length of 16 n×m, where n and m are positive integer equal to or greater than 1, and each of said sub-sampled sequence of the transform coefficients has a length of 16.

According to the second aspect of the present invention, there is provided a computer program to be used in image coding, wherein the coding process comprises the steps of:
  forming at least a block of transform coefficients from the image data, and
  scanning the block of transform coefficients for providing a sequence of transform coefficients. The computer program is characterized by
  an algorithm for sub-sampling the transform coefficients in the sequence in an interleaved manner for providing a plurality of sub-sampled sequences of transform coefficients.

Advantageously, the coding process further comprises the step of coding the sub-sampled sequences of transform coefficients using an entropy encoder.

Alternatively, the coding process further comprises the step of coding the sequence of transform coefficients using an entropy encoder prior to said sub-sampling.

According to the third aspect of the present invention, there is provided an image encoder for receiving image data and providing a bitstream indicative of the image data. The image encoder is characterized by:
  means for forming at least a block of transform coefficients from the image data, by
  means for scanning the block of transform coefficients for forming an ordered sequence of transform coefficients from the block, by
  a software program for sub-sampling the ordered sequence of transform coefficients in order to form a plurality of sub-sampled sequences of transform coefficients, by
  means for entropy coding the sub-sampled sequences of transform coefficients for provided signals indicative of the encoded transform coefficients, and by
  means, for providing the bitstream based on the signals.

According to the fourth aspect of the present invention, there is provided an image coding system comprising a server for providing a bitstream indicative of image data and a client for reconstructing the image data based on the bitstream, wherein the server characterized by
  a receiver for receiving signals indicative of the image data, by
  means for forming at least a block of transform coefficients from the signals, by
  means for scanning the block of transform coefficients for forming an ordered sequence of transform coefficients from the block, by
  a software program for sub-sampling the ordered sequence of transform coefficients in order to form a plurality of sub-sampled sequences of transform coefficients, by
  means for entropy coding the sub-sampled sequences of transform coefficients for provided further signals indicative of the encoded transform coefficients, and by
  means, for providing the bitstream based on the further signals.

BRIEF DESCRIPTION OF THE DRAWINGS

FIG. 6a is one-dimensional array representing a vector, according to the 4×4 block of FIG. 5a, to be passed to the 4×4 CAVLC algorithm.

FIG. 6b is one-dimensional array representing a vector, according to the 4×4 block of FIG. 5b, to be passed to the 4×4 CAVLC algorithm.

FIG. 6c is one-dimensional array of coefficients representing a vector, according to the 4×4 block of FIG. 5c, to be passed to the 4×4 CAVLC algorithm.

FIG. 6d is a one-dimensional array representing a vector, according to the 4×4 block of FIG. 5d, to be passed to the 4×4 CAVLC algorithm.

FIG. 7 is a one-dimensional vector representing an ordered sequence of coefficients of a 8×8 block.

FIG. 8a is a one-dimensional array of coefficients representing the first segmented vector from the original vector, according to the present invention.

FIG. 8b is a one-dimensional array of coefficients representing the second segmented vector from the original vector, according to the present invention.

FIG. 8c is a one-dimensional array of coefficients representing the third segmented vector from the original vector, according to the present invention.

FIG. 8d is a one-dimensional array of coefficients representing the fourth segmented vector from the original vector, according to the present invention.

FIG. 11a is a 4×4 block sub-sampled from an 8×8 block of transform coefficients.

FIG. 11b is another 4×4 block sub-sampled from an 8×8 block of transform coefficients.

FIG. 11c is yet another 4×4 block sub-sampled from an 8×8 block of transform coefficients.

FIG. 11d is the fourth 4×4 block sub-sampled from an 8×8 block of transform coefficients.

BEST MODE TO CARRY OUT THE INVENTION

Figure 1:
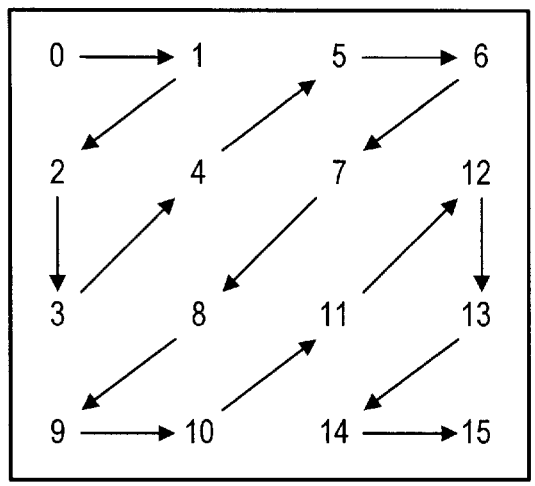
FIG. 1 is an exemplary zigzag scan for a 4×4 block.

The block segmentation method, according to the present invention, partitions an ABT block (an 8×8 block, a 4×8 or 8×4 block) of transform coefficients into 4×4 blocks, which are encoded using the standard 4×4 CAVLC algorithm. The division of the coefficients among 4×4 blocks is based on the coefficients energy to ensure that the statistical distributions of coefficients in each 4×4 blocks is similar. The energy of the coefficient depends on the frequency of the transform function to which it-corresponds and can be for example indicated by its position in the zigzag scan of the ABT block. As a result of such division, not all the coefficients selected to a given 4×4 block are adjacent to each other spatially in ABT block.

The method presented in this invention operates on blocks of coefficients produced using a 4×8, 8×4 or 8×8 transform, which have subsequently been scanned in a zigzag pattern (or any other pattern) to produce an ordered vector of coefficients.

As mentioned earlier, the goal of zigzag scanning is to pack nonzero coefficients toward the start of the coefficient vector. Effectively, the goal is to arrange the coefficients according to decreasing energy (variance). The actual scan used to accomplish this is of no consequence to this invention, provided the energy is generally decreasing.

After zigzag scanning to produce a length N ordered vector of coefficients (N being 64 for an 8×8 block, or 32 for a 4×8 or 8×4 block), the algorithm of the present invention segments this vector into N/16 smaller vectors, each of length 16. Each such vector is formed by taking every $(N/16)^{th}$ coefficient from the length N coefficient vector in a sub-sampling process. For example, if the ordered vector contains coefficients labeled $c0, c1, c2, \ldots, c63$, then the first segmented vector of length 16 contains $c0, c4, c8, c12, \ldots, c60$. The second segmented vector of length 16 vector contains $c1, c5, c9, c13, \ldots, c61$, and so on for the third and fourth vectors. For example, if the ordered vector is represented by a one-dimensional array of 64 coefficients as shown in FIG. 7, then the first, second, third and fourth segmented vectors of length 16 are shown, respectively, in FIGS. 8a–8d.

After the sub-sampled vectors of length 16 are obtained in the described manner, they are encoded using the standard 4×4 CAVLC algorithm. As written in the CAVLC description, coding of nonzero coefficients relies on the number of nonzero coefficients of the upper and left neighboring 4×4 blocks (See FIGS. 8a to 8d). Therefore each of the vectors created by splitting ABT block is assigned the spatial locations of one of the 4×4 blocks created by dividing ABT block spatially. For example when the method of the present invention operates on 8×4 block the first vector is assigned upper 4×4 block and the second vector lower block.

In the method, according to the present invention, where every fourth coefficient is selected as shown in FIGS. 8a–8d, one coefficient out of the first ("most significant") four coefficients numbered 0–4 is allocated to each 4×4 block. One coefficient out of the next group of four (numbered 4–7) is allocated to each 4×4 block. The same pattern repeats for remaining groups of four coefficients. This has the effect of "balancing" the amount of energy in each of the resulting 4×4 blocks. According to our experiments, this algorithm requires an average of 3–5% fewer bits to represent a given video sequence, when compared to the existing solution.

Figure 2:
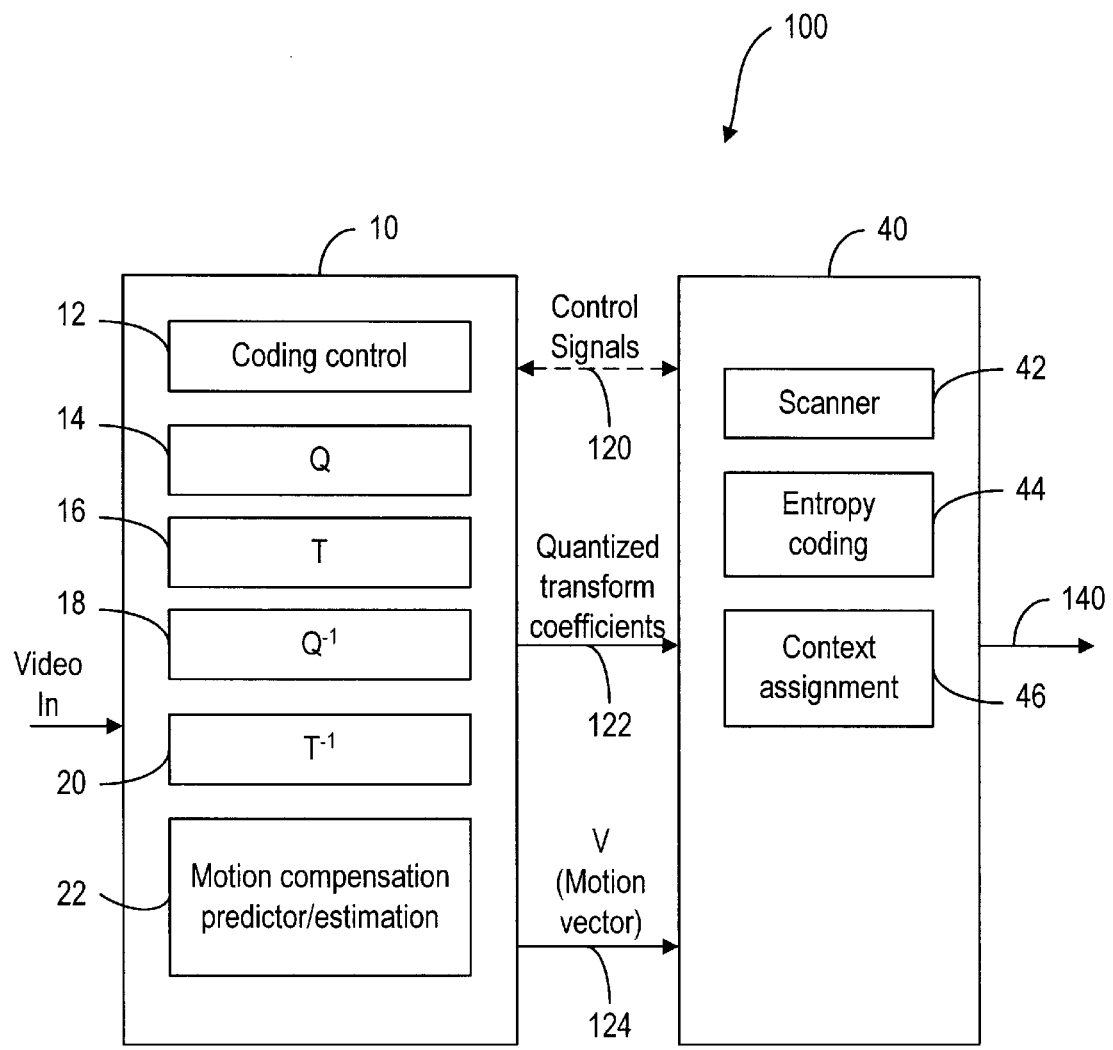
FIG. 2 is a block diagram showing a typical video server, which employs block-based transform coding and motion-compensated prediction.
Figure 3:
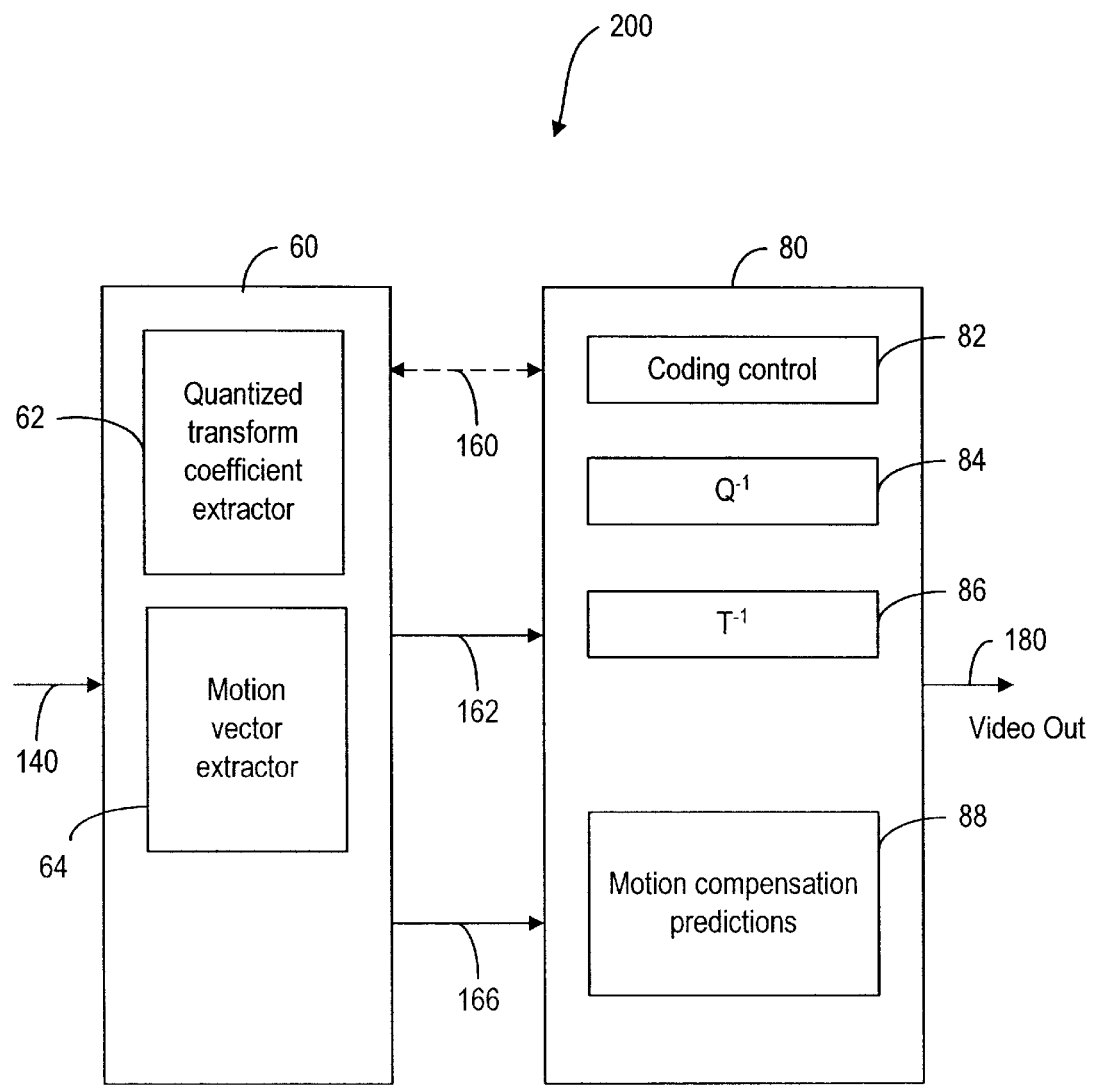
FIG. 3 is a block diagram showing a typical video client corresponding to the encoder of FIG. 2.
Figure 5A:
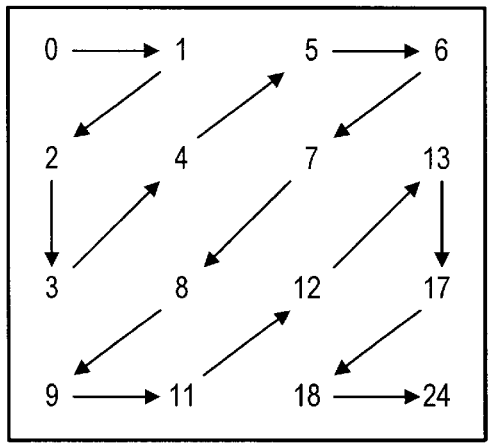
FIG. 5a is a 4×4 sub-block from the 8×8 block of FIG. 4.
Figure 5B:
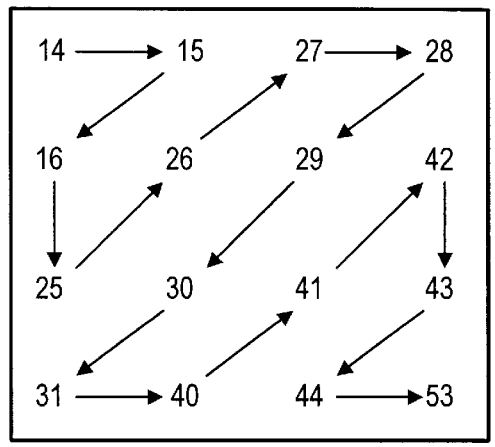
FIG. 5b is another 4×4 sub-block from the 8×8 block of FIG. 4.
Figure 5C:
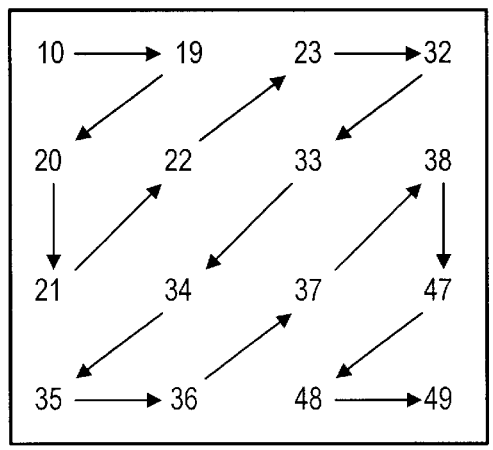
FIG. 5c is yet another 4×4 sub-block from the 8×8 block of FIG. 4.
Figure 5D:
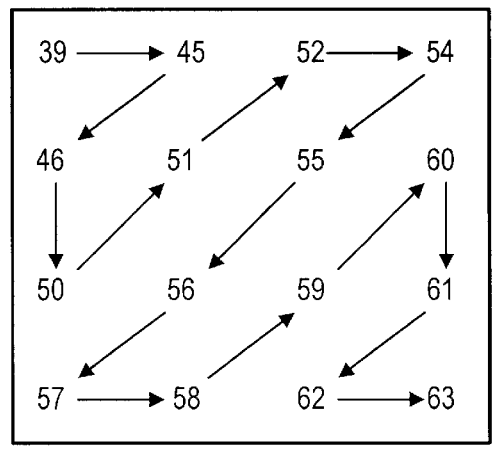
FIG. 5d is the fourth 4×4 sub-block from the 8×8 block of FIG. 4.
Figure 9:
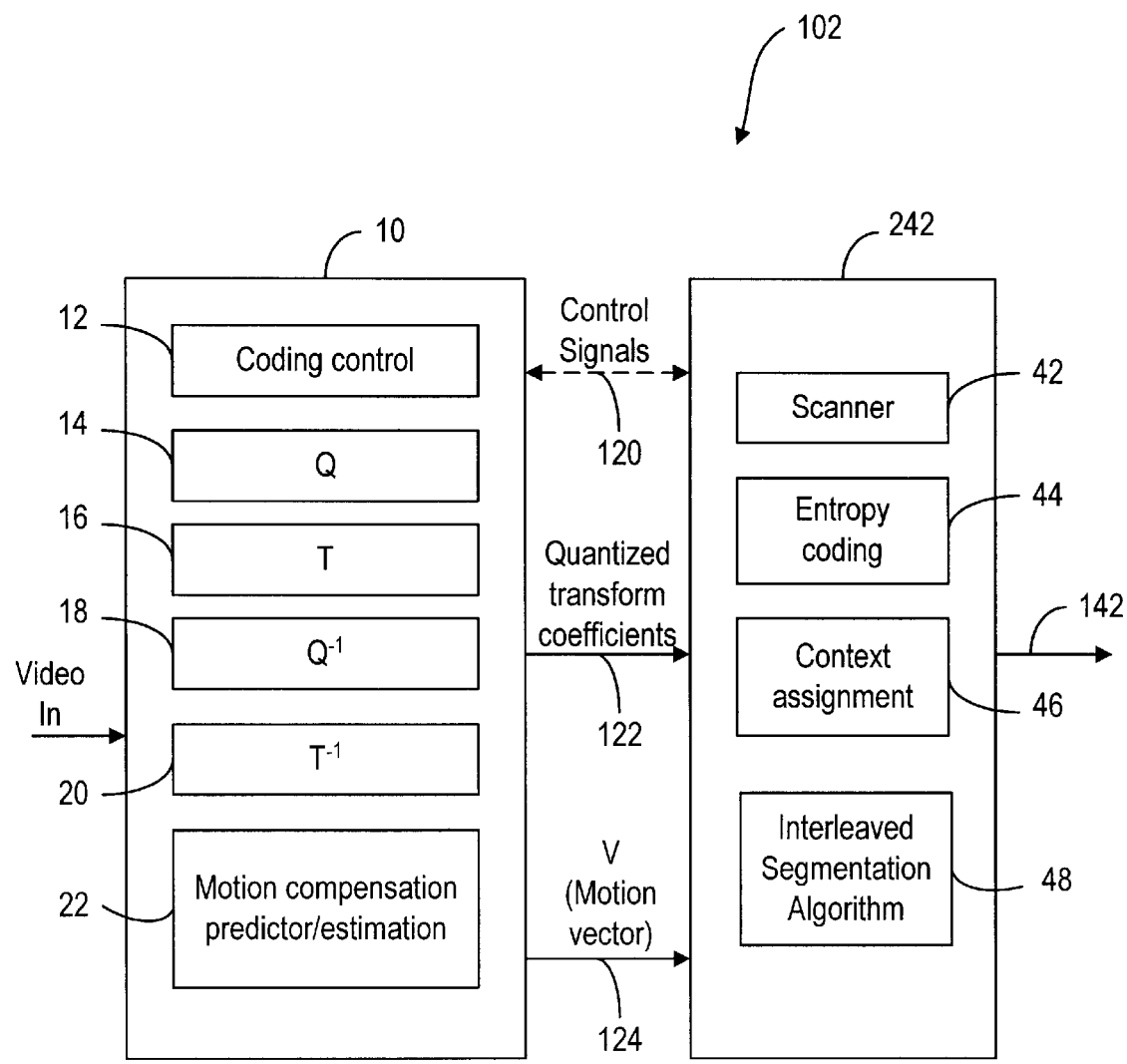
FIG. 9 is a block diagram showing an exemplary video server, according to the present invention.
Figure 10:
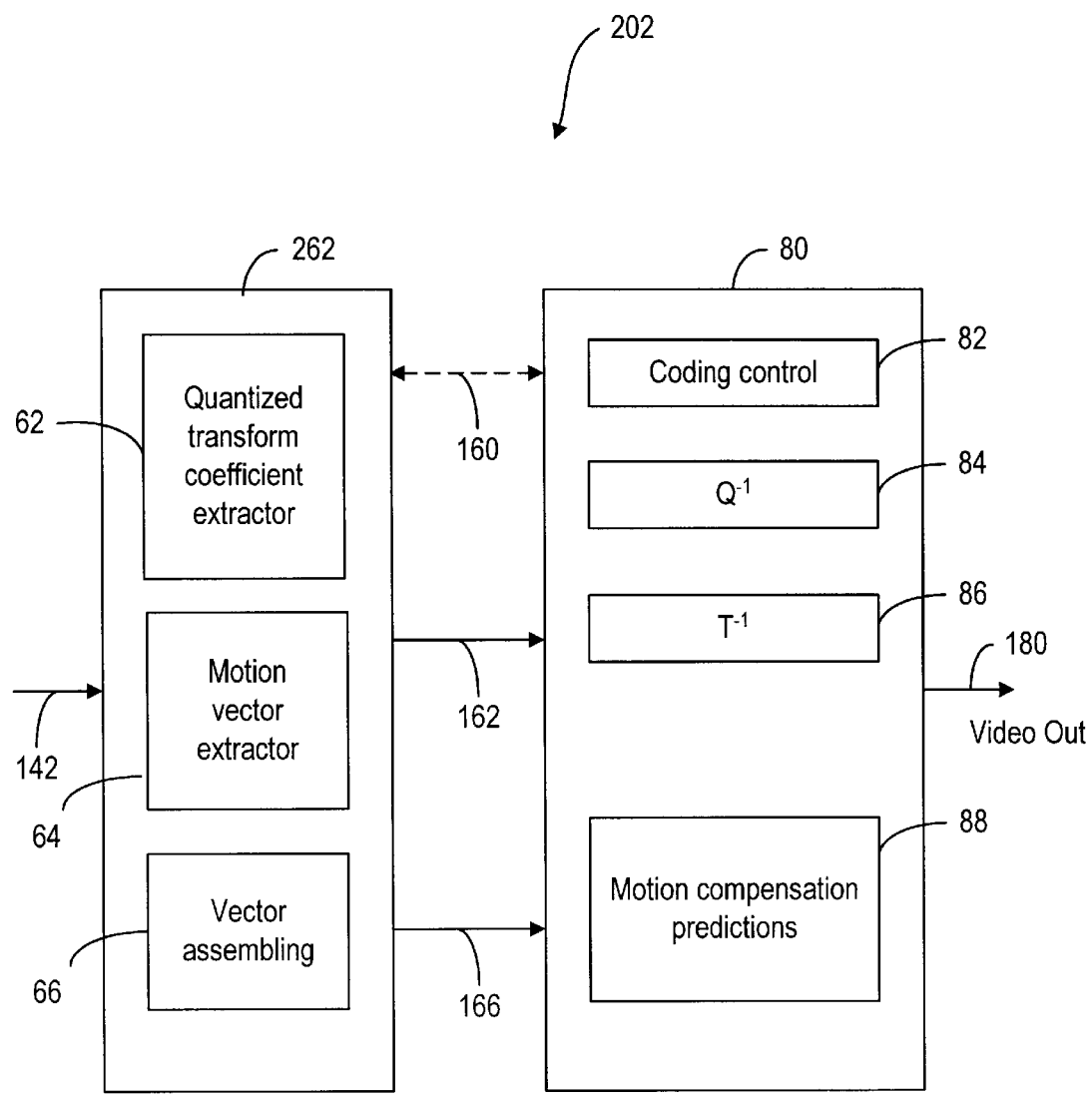
FIG. 10 is a block diagram showing a video client, according to the present invention, which is corresponding to the video encoder of FIG. 9.

To facilitate the video coding using the vector segmentation method, according to the present invention, a video server 102 as shown in FIG. 9 and a video client 202 as shown in FIG. 10 can be used. The major difference between the encoder 242, according to the present invention, and the typical encoder 40 (FIG. 2) is that the multiplex encoder 242 comprises an interleaving segmentation unit 48 for segmenting an ABT block (a 4 n×4 m block, with n, m being positive integer equal to or greater than 1) into n×m blocks in an interleaved manner, as illustrated in FIGS. 8a–8d. According to the present invention, after the scanning unit 42 produces an ordered vector of coefficients of length N (N=16 n×m), a computer software in the interleaving segmentation unit 48 having an algorithm is used to segment this ordered vector into n×m smaller vectors, each of which has a length of 16. Each such vector is formed by taking every (n×m)$^{th}$ coefficients from the ordered coefficient vector of length N. Thus, the bitstream 142 is indicative of the contexts of the n×m segmented vectors.

Likewise, in the decoder 262 of the client 202 has a vector assembling unit 66, which has a computer program with an algorithm for regrouping the coefficients in n×m segmented vectors into an ordered vector of length N.

It should be noted that the algorithm as described in conjunction with FIGS. 8a to 10 is a specific embodiment of a more general concept. It is possible to assign a number to each position in the length N vector representing its "distance" from the DC (or first) term in the vector. This value should reflect the relative importance of the coefficients in that position. For example, in FIG. 1, the selection of whether to encode position 1 or 2 first is nearly arbitrary; therefore they might be assigned the same "distance" or "cost" value.

Ensuring that all blocks possess similar characteristics (i.e. are suited to the CAVLC coder) is then a minimization problem. For each possible allocation pattern, the total "cost" of coefficients in each 4×4 block can be calculated, and the variance across the 4×4 blocks taken. The allocation pattern that minimizes the variance will lead to blocks with the most similar statistical properties.

Mathematically, if P is the set of allocation patterns, then we want to calculate the value of p such that $$\sigma^2 = \min_p \sigma_p^2$$

where $$\sigma_p^2 = \text{var}\left\{ \sum_i^{16} d_{1,i}, \ldots, \sum_i^{16} d_{N/16,i} \right\}$$

and $d_{i,j}$ is the "cost" of the i$^{th}$ coefficient in the j$^{th}$ segmented vector. As mentioned above, the allocation pattern described here is one example of an attempt to minimize the "cost variance" between segmented blocks. It should be understood that if the allocation patterns are selected adaptively, information on the allocation pattern that is used at the encoder needs to be transmitted to the decoder. Alternatively, the allocation pattern can be determined from other parameters used in the coding of the image. What is essential here is that both the encoder and the decoder use the same allocation pattern, since otherwise the coded image cannot be decoded properly.

It should be noted that the DC coefficient can be coded differently and separately. However, in order to ensure that the existing 4×4 CAVLC is unchanged, the DC coefficient is not treated any differently than the 3 lowest-frequency AC values. Treating the DC coefficient separately would mostly result in a benefit when there are very few coefficients in the block (for example, for an 8×8 block, three out of four 4×4 blocks are empty). In this case, it may be desirable to exclude the DC term from the prediction of number of non-zero values. However, the benefit may not be significant in general.

The distance/cost metric intrinsic to a coefficient's position in the scan can be used to determine which 4×4 block that coefficient is allocated to. For example, a cost pattern of "(0 0 0 0 1 1 1 1 2 2 2 2 3 3 3 3 . . . " can be used for such determining. Alternatively, a cartesian distance such as "0111.42 . . . " can be used. The effect of the allocation algorithm is to create blocks with an equal or approximately equal total cost. As such, the variance of the total cost for each block is taken to be a measure of the similarity. The block selected for the next coefficient in the scan is the block with the lowest accumulated cost of coefficients allocated to it so far.

Figure 4:
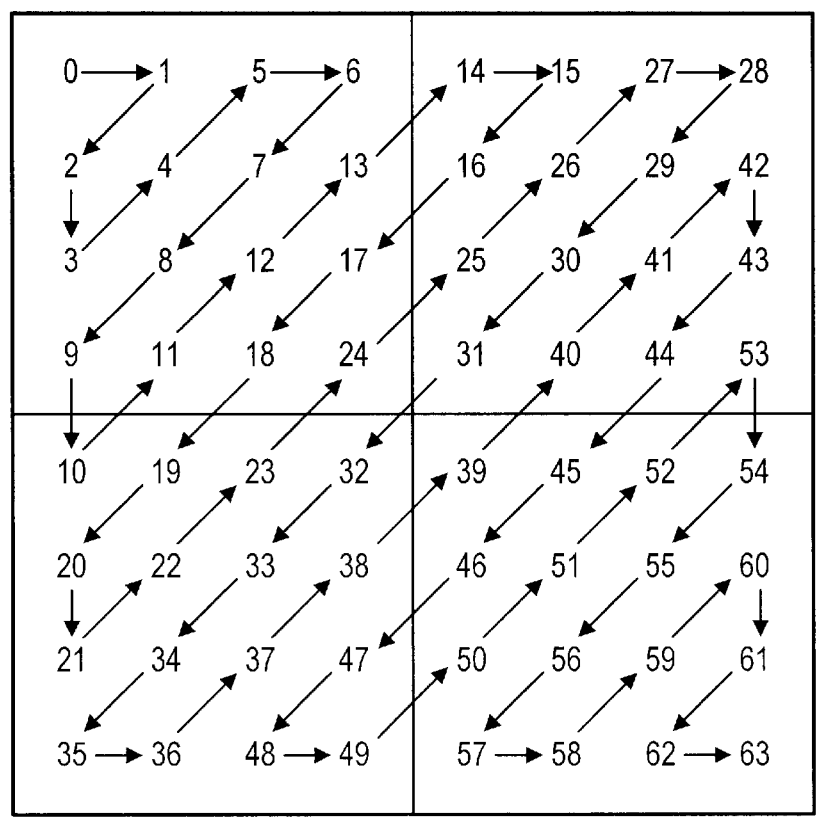
FIG. 4 is an exemplary zigzag scan for an 8×8 block.

It is also possible that, prior to zigzag scanning, a pre-determined sub-sample procedure is used to sub-sample the 8×8 block as shown in FIG. 4 into four "interleaved" sub-blocks as shown in FIGS. 11a–11d. A zigzag scan is then applied to these sub-blocks in order to produce four ordered vectors of length 16. As such, the result is equivalent to that shown in FIGS. 8a to 8d. Accordingly, it is possible to provide an image coding method, which comprises the steps of:

1. forming at least a block of transform coefficients for the image data;
2. sub-sampling the transform coefficients in the block in a pre-determined manner for providing a plurality of sub-sampled blocks of transform coefficients;
3. scanning the sub-sampled blocks of transform coefficients for providing a plurality of sub-sampled sequences of transform coefficients, and
4. coding the sub-sampled sequences of transform coefficients using an entropy encoder.

The method of the present invention as described herein above divides coefficients corresponding to different frequencies of the ABT transform among 4×4 blocks more equally. Therefore the created 4×4 blocks have properties statistically similar to those expected by the CAVLC coder, which leads to increased coding efficiency.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of image coding using data indicative of an image, characterized by
    forming at least a block of transform coefficients from the image data, by
    scanning the block of transform coefficients for providing a sequence of transform coefficients, by
    sub-sampling the transform coefficients in the sequence in an interleaved manner for providing a plurality of sub-sampled sequences of transform coefficients, and by
    coding the sub-sampled sequences of transform coefficients using an entropy encoder.

2. The method of claim 1, wherein said sub-sampling is carried out prior to said coding.

3. A method of image coding using data indicative of an image, characterized by
    forming at least a block of transform coefficients from the image data, by
    scanning the block of transform coefficients for providing a sequence of transform coefficients, by
    coding the transform coefficients using an entropy encoder for providing a sequence of coded transform coefficients, and by sub-sampling the sequence of the coded transform coefficients in an interleaved manner for providing a plurality of sub-sampled sequences of coded transform coefficients.

4. The method of claim 1, wherein said sequence of the transform coefficients has a length of 16×n×m, where n and m are positive integer equal to or greater than 1.

5. The method of claim 4, wherein each of said sub-sampled sequence of the transform coefficients has a length of 16.

6. The method of claim 1, wherein said image data is prediction error data.

7. The method of claim 1, wherein said image data is pixel data.

8. The method of claim 1, further characterized by quantizing the transform coefficients into quantized transform coefficients.

9. A software product stored on a computer readable medium for use in image coding image data indicative of an image, wherein the coding process comprises the steps of:

forming at least a block of transform coefficients from the image data, and scanning the block of transform coefficients for providing a sequence of transform coefficients, said software product characterized by an algorithm for sub-sampling the transform coefficients in the sequence in an interleaved manner for providing a plurality of sub-sampled sequences of transform coefficients.

10. The software product stored on a computer readable medium of claim 9, wherein the coding process further comprises the step of coding the sub-sampled sequences of transform coefficients using an entropy encoder.

11. The software product stored on a computer readable medium of claim 9, wherein the coding process further comprises the step of coding the sequence of transform coefficients using an entropy encoder prior to said sub-sampling.

12. An image encoder for receiving image data and providing a bitstream indicative of the image data, characterized by:

means for forming at least a block of transform coefficients from the image data, by means for scanning the block of transform coefficients for forming an ordered sequence of transform coefficients from the block, by a software program stored on a computer readable medium for sub-sampling the ordered sequence of transform coefficients in order to form a plurality of sub-sampled sequences of transform coefficients, by means for entropy coding the sub-sampled sequences of transform coefficients for provided signals indicative of the encoded transform coefficients, and by means, for providing the bitstream based on the signals.

13. An image coding system comprising a server for providing a bitstream indicative of image data and a client for reconstructing the image data based on the bitstream, wherein the server characterized by a receiver for receiving signals indicative of the image data, by means for forming at least a block of transform coefficients from the signals, by means for scanning the block of transform coefficients for forming an ordered sequence of transform coefficients from the block, by a software program stored on a computer readable medium for sub-sampling the ordered sequence of transform coefficients in order to form a plurality of sub-sampled sequences of transform coefficients, by means for entropy coding the sub-sampled sequences of transform coefficients for provided further signals indicative of the encoded transform coefficients, and by means, for providing the bitstream based on the further signals.

14. A method of image coding using image data indicative of an image, characterized by forming at least a block of transform coefficients from the image data, by sub-sampling the transformation coefficients in the block in an interleaved manner for providing a plurality of sub-sampled blocks of transform coefficients, by scanning the sub-sampled blocks of transform coefficients for providing a plurality of sub-sampled sequences of transform coefficients, and by coding the sub-sampled sequences of transform coefficients using an entropy encoder.

15. A method of image coding using image data indicative of an image, wherein at least a block of transform coefficients is formed from the image data and the block of transformation coefficients is scanned for providing a sequence of transform coefficients located at a plurality of positions in the sequence, wherein the positions include a reference position so that each of said plurality of positions relative to the reference position defines a distance, said method characterized by assigning a cost value to each of the distances, by arranging the transform coefficients in the sequence into a plurality of sub-sequences based on the cost values, and by coding the sub-sequences of transform coefficients using an entropy encoder.

16. The method of claim 15, wherein each of the sub-sequences has a total cost indicative of a sum of the cost values associated with the transform coefficients in said each sub-sequence, said method characterized in that said arranging is adapted to achieve a minimum in the difference between the total cost of said each sub-sequences and the total cost of each of the other sub-sequences.

* * * * *